(12) United States Patent
Liu et al.

(10) Patent No.: US 8,660,074 B2
(45) Date of Patent: Feb. 25, 2014

(54) METHOD AND APPARATUS FOR ALLOCATING RESOURCES AMONG MULTIPLE USERS

(75) Inventors: Qi Liu, Shanghai (CN); Fan Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 378 days.

(21) Appl. No.: 13/125,013

(22) PCT Filed: Jul. 13, 2009

(86) PCT No.: PCT/CN2009/072747
§ 371 (c)(1),
(2), (4) Date: Apr. 19, 2011

(87) PCT Pub. No.: WO2010/006546
PCT Pub. Date: Jan. 21, 2010

(65) Prior Publication Data
US 2011/0199933 A1    Aug. 18, 2011

(30) Foreign Application Priority Data
Jul. 14, 2008 (CN) .......................... 2008 1 0132877

(51) Int. Cl.
*H04W 4/00* (2009.01)
(52) U.S. Cl.
USPC .......................................................... 370/329
(58) Field of Classification Search
USPC .......................................................... 370/252
See application file for complete search history.

(56) References Cited

U.S. PATENT DOCUMENTS

| 2005/0053038 A1* | 3/2005 | Kimura ........................... 370/333 |
| 2005/0201474 A1* | 9/2005 | Cho et al. ....................... 375/260 |
| 2005/0208973 A1* | 9/2005 | Iochi .............................. 455/561 |
| 2006/0111100 A1* | 5/2006 | Murata et al. ................. 455/423 |
| 2006/0165091 A1* | 7/2006 | Arima et al. ............. 370/395.21 |
| 2008/0004062 A1* | 1/2008 | Nibe ............................. 455/519 |

(Continued)

FOREIGN PATENT DOCUMENTS

| CN | 1625089 A | 6/2005 |
| CN | 1878142 A | 12/2006 |

(Continued)

OTHER PUBLICATIONS

Search Report issued in corresponding Chinese Patent Application No. 2011100603912, dated Jan. 24, 2013.

(Continued)

*Primary Examiner* — Luat Phung
(74) *Attorney, Agent, or Firm* — Brinks Gilson & Lione

(57) ABSTRACT

A method and apparatus for allocating resources among multiple users are provided. The method includes: determining the code allocation manners of multiple users involved in resource allocation, and determining a CQI value for each user in each code allocation manner; obtaining a TBS of each user corresponding to the determined CQI value and code for each user; and obtaining the total TBS of all users involved in resource allocation in each code allocation manner, and selecting the combination of the CQI value and code allocation manner corresponding to the largest TBS from the total TBS to serve as the manner for resource allocation. During the resource allocation among multiple users, the channel conditions of other users are considered while allocating resources to each user. This maximizes the sent data amount.

13 Claims, 5 Drawing Sheets

(56) References Cited

U.S. PATENT DOCUMENTS

| 2009/0010208 | A1* | 1/2009 | Ishizaki | 370/328 |
| 2009/0303937 | A1* | 12/2009 | Sawahashi et al. | 370/329 |
| 2009/0313516 | A1* | 12/2009 | Shin et al. | 714/748 |
| 2010/0278152 | A1* | 11/2010 | Andreozzi et al. | 370/335 |
| 2011/0199933 | A1 | 8/2011 | Liu et al. | |

FOREIGN PATENT DOCUMENTS

| CN | 101094030 A | 12/2007 |
| CN | 101155392 A | 4/2008 |
| CN | 101309460 A | 11/2008 |
| CN | 101309460 B | 4/2011 |
| EP | 1225736 A2 | 7/2002 |
| EP | 1448012 A2 | 8/2004 |
| EP | 1523134 A1 | 4/2005 |
| EP | 1526691 A2 | 4/2005 |
| EP | 1796330 A2 | 6/2007 |
| WO | WO 2008/042514 A1 | 4/2008 |

OTHER PUBLICATIONS

Extended European Search Report issued in corresponding European Patent Application No. 09797393.7, mailed Feb. 28, 2012.
International Search Report issued in corresponding PCT Application No. PCT/CN2009/072747; mailed Oct. 22, 2009.
The Written Opinion of the International Searching Authority issued in corresponding PCT Application PCT/CN2009/072747; mailed Oct. 22, 2009.
Office Action issued in corresponding Canadian Patent Application No. 2,740,110, mailed Jun. 19, 2013, 4 pages.

* cited by examiner

METHOD AND APPARATUS FOR ALLOCATING RESOURCES AMONG MULTIPLE USERS

CROSS-REFERENCE TO RELATED APPLICATIONS

This application is a National Stage of International Application No. PCT/CN2009/072747, filed on Jul. 13, 2009, which claims priority to Chinese Patent Application No. 200810132877.0, filed on Jul. 14, 2008, both of which are hereby incorporated by reference in their entireties.

FIELD OF THE APPLICATION

The present application relates to the communication technology, and in particular, to a method and apparatus for allocating resources among multiple users.

BACKGROUND OF THE APPLICATION

The Third Generation Partnership Project (3GPP) introduces the high speed data packet access (HSDPA) from Release 5. In the HSDPA, the packet switching technology is adapted, which implements data transmission with a short sub-frame of transmission time interval (TTI).

In the HSDPA, the network side can dynamically allocates the transmit power and transmission rate to a user equipment (UE) for data transmission based on the channel conditions of the UE. The UE periodically reports the channel quality indicator (CQI) value over the high speed dedicated physical control channel (HS-DPCCH). The CQI value indicates the channel conditions of the UE. Release 5 protocol defines 30 CQI values. Each CQI value indicates a combination of the transmit block size (TBS), number of channels, and modulation mode. Because a probability of correctly receiving the TBS is related to a received signal noise ratio (SNR), the CQI value can be mapped into the combination of the TBS, number of channels, and modulation mode, and meanwhile is corresponding to an SNR.

In the network supporting the HSDPA, each cell allocates a certain number of air interface resources for HSDPA data transmission. These air interface resources mainly include the air interface transmit power, and air interface transmission high speed physical data sharing channel (HS-PDSCH) codes, which are shared competitively by all users in a cell. In every TTI, the network determines to which users the data is to be sent at the current TTI, at which rate the data is to be sent, and how many resources are to be allocated. User selection is determined by a scheduling algorithm. The scheduling algorithm calculates the priority for each user, and the air interface resources are allocated to each user based on the priority. The data transmission requirements of users with higher priorities are first met. If there are remaining resources, they are allocated to the users with lower priorities.

The inventor finds that: in the prior art, the current resource allocation policy is to allocate resources to the users with high priorities first for data transmission, and allocate the remaining resources to the users with low priorities. The resource allocation is performed in serial based on the scheduling priority until the resources are exhausted.

However, the channel conditions of different users vary, the policy that users with high priorities occupy all resources fails to consider the difference of users' channel conditions. As a result, the throughput rate of a cell cannot be maximized.

SUMMARY OF THE APPLICATION

Embodiments of the present application provide a method and apparatus for allocating resources among multiple users to implement resource allocation with comprehensive consideration of channel conditions of all users, so as to maximize the sent data amount.

One embodiment provides a method for allocation resources among multiple users, including:

determining code allocation manners of multiple users involved in a resource allocation, and determining a channel quality indicator (CQI) value for each user in each code allocation manner;

obtaining a transmission block size (TBS) of the each user corresponding to determined CQI value and code for each user; and obtaining a total TBS of all users involved in the resource allocation in each code allocation manner, and selecting a combination of a CQI value and a code allocation manner corresponding to the largest TBS from all total TBSs to serve as the manner for the resource allocation.

One embodiment also provides an apparatus for allocating resources among multiple users, including:

a code determining module, configured to determine the code allocation manners of multiple users involved in resource allocation;

a channel quality indicator (CQI) value determining module, configured to determine a CQI value for each user in each code allocation manner;

a transmission block size (TBS) obtaining module, configured to obtain the TBS of each user corresponding to the determined CQI value and code for each user; and a resource allocating and determining module, configured to obtain a total TBS of all users involved in resource allocation in each code allocation manner, and select the combination of the CQI value and code allocation manner corresponding to the largest TBS from all total TBSs to serve as the manner for the resource allocation.

According to the embodiments, the code allocation manners for multiple users are determined and then the CQI value of each user in each manner is determined. Based on the CQI value, the TBS corresponding to the CQI value is obtained for each user so as to obtain the total TBS of all users in the code allocation manners. Then, the combination of the CQI value and code allocation manner corresponding to the maximum TBS from the total TBS is selected to serve as the manner for resource allocation. According to the embodiments, during the resource allocation among multiple users, the channel conditions of other users are considered while allocating resources to each user. Thus the sent data amount is maximized.

BRIEF DESCRIPTION OF THE DRAWINGS

The drawings described in this section are for illustration and are not intended to limit the scope of the claims. Among the drawings:

DETAILED DESCRIPTION OF THE EMBODIMENTS

The embodiments are described in detail with reference to the accompanying drawings. The embodiments described are merely exemplary, and therefore are not intended to limit the scope of the claims.

Figure 1:
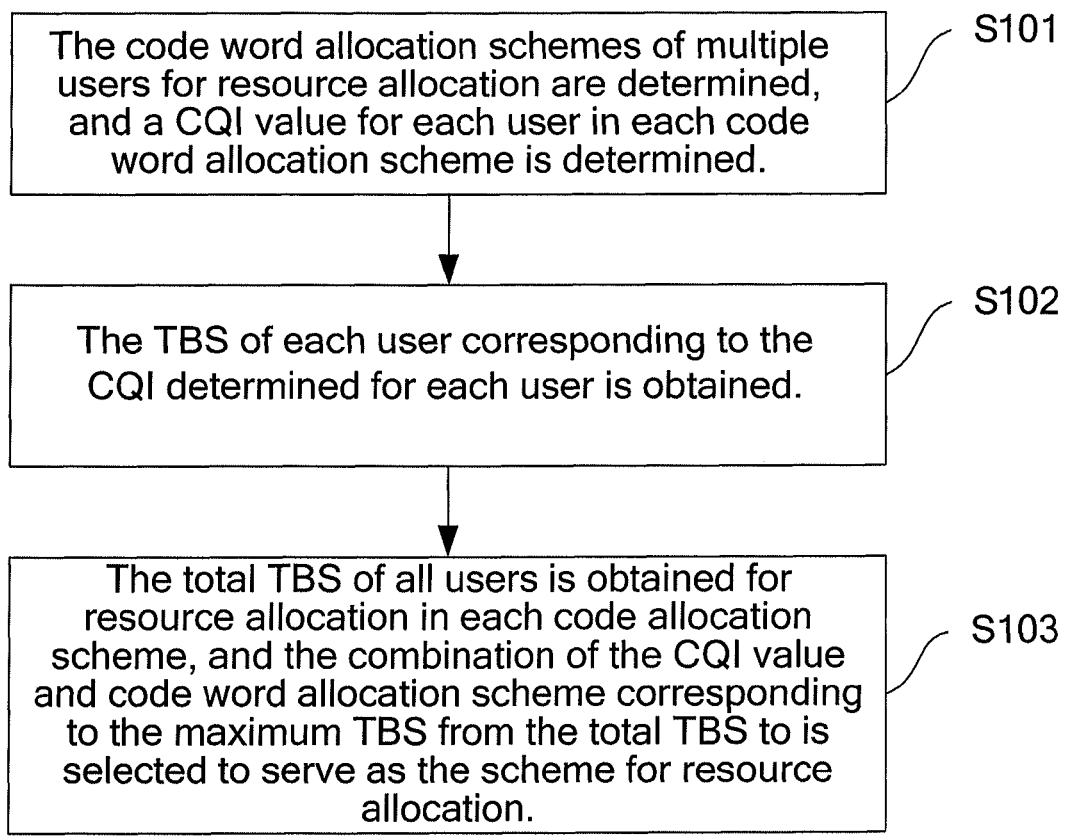
FIG. 1 is a flowchart of a method for allocating resources among multiple users according to one embodiment.

One embodiment provides a method for allocation resources among multiple users. With this method, HSDPA air interface transmission resources may be allocated to multiple users at the same time, and the channel conditions of the multiple users are considered in resource allocation. This method maximizes a total data amount sent by users. FIG. 1 is a flowchart of a method for allocating resources among multiple users according to one embodiment. The method includes as follows.

Step S101: The code allocation manners of multiple users involved in the resource allocation are determined, and a CQI value for each user in each code allocation manner is determined.

The determining of the code allocation manners of multiple users is specifically determining the code allocation manner of each user for resource allocation. For example, when 10 codes are available in a cell and resources are to be allocated to two users, the possible code allocation manners are shown as in Table 1.

TABLE 1

| Manner Number | $k_1$ | $k_2$ |
|---|---|---|
| 1 | 9 | 1 |
| 2 | 8 | 2 |
| 3 | 7 | 3 |
| 4 | 6 | 4 |
| 5 | 5 | 5 |
| 6 | 4 | 6 |
| 7 | 3 | 7 |
| 8 | 2 | 8 |
| 9 | 1 | 9 |

Wherein $k_i$ indicates the number of HS-PDSCH codes available to the $i^{th}$ user.

It should be noted that, code allocation manners for more users may be deduced by analogy and are not enumerated here.

The CQI value of each user in each code allocation manner may be determined in the following mode:

calculating the HS-PDSCH transmit power allocated to each user according to a total HS-PDSCH air interface transmit power of a cell, channel gain of each of the users, and the code allocated to each user.

For example, when the total HS-PDSCH air interface transmit power is $P_{total}$, the channel gain of the $i^{th}$ user is $\lambda_i$, and the code allocated to the $i^{th}$ user is $k_i$, the HS-PDSCH transmit power $P_i$ is:

$$P_i = k_i \times \left[ \frac{\left( P_{total} - \sum_{i=1}^{N}\left(k_i * \frac{1}{\lambda_i}\right) \right)}{\sum_{i=1}^{N} k_i} - \frac{1}{\lambda_i} \right]$$

N indicates the number of users among whom resources are allocated.

The CQI value of each user corresponding to the allocated HS-PDSCH transmit power is determined according to the HS-PDSCH transmit power allocated to each user. For example, when the decibel value of the HS-PDSCH transmit power $P_i$ allocated to the $i^{th}$ user is $P_{i,dB}$ and the reported CQI value of the $i^{th}$ user is $CQI_{i,report}$, the CQI value $CQI_i$ of the $i^{th}$ user corresponding to the HS-PDSCH transmit power allocated to the $i^{th}$ user is:

$$CQI_i = CQI_{i,report} + P_{i,dB} - P_{cpich} - MPO$$

$P_{cpich}$ is a common pilot channel (CPICH) power and the measured power offset (MPO) may be a value configured at the upper layer.

In addition, the CQI value of each user in each code allocation manner may be determined in another mode. For example, presetting a traversal range of the CQI value of each user in each word allocation manner, calculating the maximum CQI value available to the user with a maximum reported CQI value, and then determining the CQI value of the user with a maximum reported CQI based on the calculated maximum CQI value available to the user and traversal range of the CQI value. To be specific, the CQI value available to the user with a maximum reported CQI value is calculated based on the CQI values selected by the remaining users among all users involved in the resource allocation, the reported CQI values of the remaining users, the user with a maximum reported CQI value, the total HS-PDSCH air interface transmit power of a cell, and the CPICH transmit power of the cell. For example, assume that resources are allocated to two users, the traversal range of the CQI value is 5, the user whose reported CQI value is maximum is m, if the CQI value of another user, such as user i, is known, the formula for calculating the CQI value available to user m may be as follows:

$$CQI_{m,Select} = CQI_{m,report} - (P_{cpich} + MPO) + lin2db\left( P_{total} - \sum_{i=1,i\neq m}^{N} db2lin(P_{cpich} + MPO + CQI_{i,Select} - CQI_{i,report}) \right)$$

Wherein lin2db indicates that the linear value is converted into dB value, db2lin indicates that the dB value is converted into the linear value, $CQI_{i,Select}$ indicates a selected CQI value for user i, and $CQI_{i,report}$ indicates a reported CQI value of user i. When $CQI_{i,Select}$ selected by all users except user m is minimum and the calculated $CQI_{m,Select}$ is the maximum CQI value $CQI_{m,max-Select}$ that is available to user m. Thus the determined CQI value of the user with maximum reported CQI value may be $CQI_{m,max-Select}$, $CQI_{m,max-Select}-1$, . . . , or $CQI_{m,max-Select}-5$.

Then the CQI values of remaining users among all users involved in the resource allocation are determined based on the CQI value of the user with the maximum reported CQI value. To be specific, the power obtained by subtracting the power consumed by the user with the maximum CQI value from the total power is converted into a CQI value, and then the CQI values of the remaining users are obtained. For example, when resources are allocated to two users and the traversal range of the CQI value is 5, the CQI value available to another user except user m can be obtained by converting the remaining power obtained by subtracting the power consumed by user m from. A maximum of 6 options are available, that is, {CQIi,Select, CQI'i,Select, CQI'''i,Select, . . . , CQI''''i,Select}.

Step S102: The TBS of each user corresponding to the CQI determined for each user is obtained.

In addition, after the CQI of each user is determined, the TBS corresponding to the CQI value can be obtained by searching the CQI-TBS extended table. Table 2 is an example of the CQI-TBS extended table.

TABLE 2

| | Codes | | | | |
|---|---|---|---|---|---|
| CQI | 9, 1 | 8, 2 | ... | 2, 8 | 1, 9 |
| $CQI_{1,max\text{-}Select}$, $CQI_{2,Select}$ | TBS | ... | ... | ... | ... |
| $CQI_{1,max\text{-}Select}\text{-}1$, $CQI'_{2,Select}$ | ... | ... | ... | ... | ... |
| ... | ... | ... | ... | ... | ... |
| $CQI_{1,max\text{-}select}\text{-}5$, $CQI''''_{2,Select}$ | ... | ... | ... | ... | ... |

Step S103: The total TBS of all users involved in resource allocation in each code allocation manner is obtained, and the combination of the CQI value and code allocation manner corresponding to the maximum TBS from the total TBS is selected to serve as the manner for resource allocation.

Accordingly, the code allocation manner corresponding to the maximum TBS is used to allocate code resources among users, and the HS-PDSCH transmit power is allocated to the user based on the CQI value corresponding to the maximum TBS.

According to embodiments, the code allocation manners for multiple users are determined and then the CQI value of each user in each manner is obtained. Based on the CQI value, the TBS corresponding to the CQI value is obtained for each user, and then obtaining the total TBS of all users in the code allocation manners based on the sum of the TBS of each user. Then, the combination of the CQI value and code allocation manner corresponding to the maximum TBS from the total TBS is selected to serve as the manner for resource allocation. Because the TBS indicates the sent data amount of the user, when the total TBS is maximum, the sent data amount of multiple users is maximum. According to the embodiments, during the resource allocation among multiple users, the channel conditions of other users are considered while allocating resources to each user. This maximizes the total sent data amount.

Figure 2:
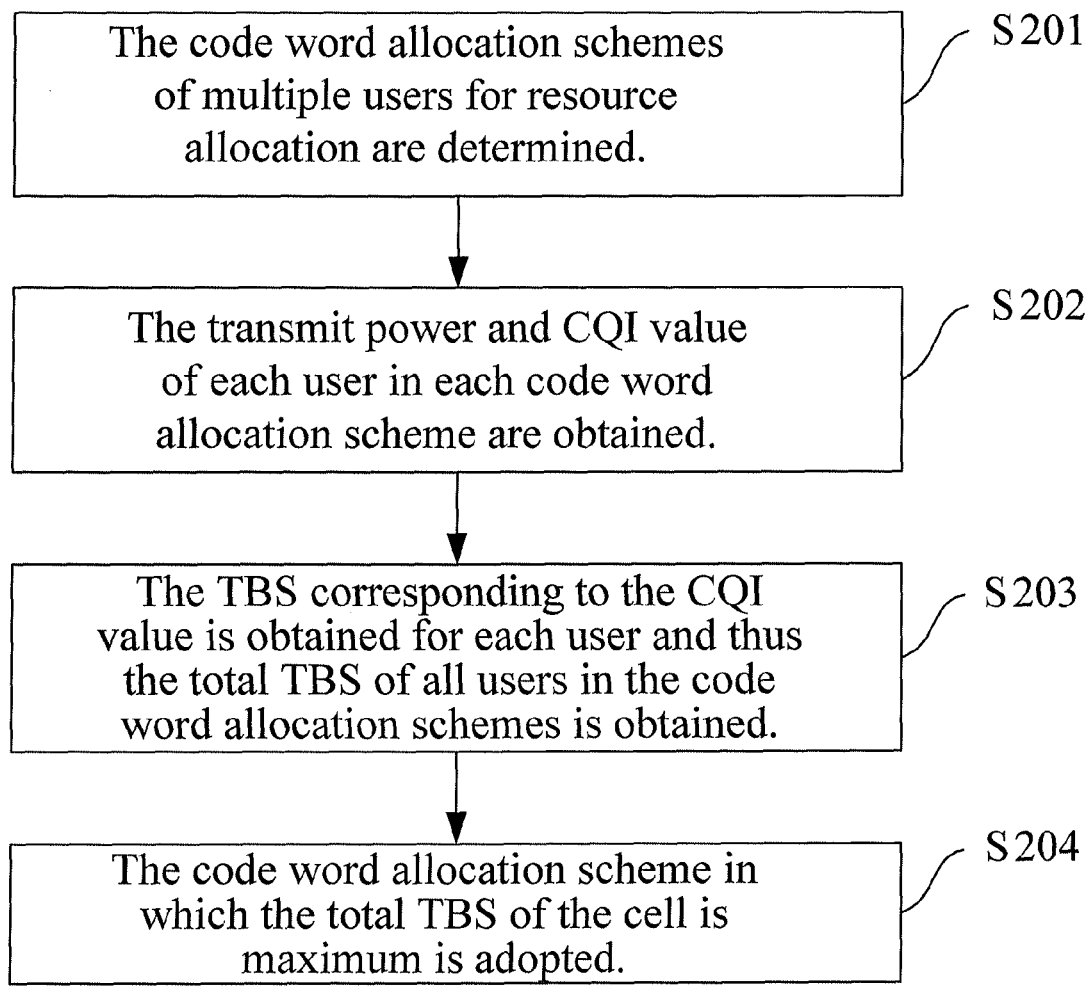
FIG. 2 is a flowchart of a method for allocating resources among multiple users according to another embodiment.

FIG. 2 is a flowchart of another method for allocating resources among multiple users according to one embodiment. The method includes as follows.

Step S201: The code allocation manners of multiple users involved in the resource allocation are determined.

For example, when 10 codes are available in a cell and resources are to be allocated to two users, the possible code allocation manners are shown as in Table 1.

Step S202: The transmit power and CQI value of each user in each code allocation manner are obtained.

To be specific:
a) The constant u is calculated based on the formula $$u = \frac{\left(P_{total} - \sum_{i=1}^{N}\left(k_i \times \frac{1}{\lambda_i}\right)\right)}{\sum_{i=1}^{N} k_i},$$

where $P_{total}$ indicates the HS-PDSCH transmit power available to a cell, N indicates the number of users involved in the resources allocation, $\lambda_i$ indicates the channel gain of the $i^{th}$ user, and $k_i$ indicates the HS-PDSCH code available to the $i^{th}$ user. Channel gain $\lambda_i$ of the $i^{th}$ user may be calculated as follows:

The SNR corresponding to the CQI value is obtained based on the reported user CQI value. In Release 5 protocol, the relationship between the CQI and SNR of the HSDPA user is described as follows:

SNR=−4.5+CQI

The SNR and CQI are in the unit of dB. The SNR corresponding to the reported user CQI value is estimated based on the current channel condition on assumption that the HS-PDSCH transmit power is $P_{cpich}$+MPO. $P_{cpich}$ indicates the common pilot channel power of a cell and MPO may be a configuration of the upper layer, in the unit of dB. Therefore, the channel gain at the time when the user CQI value is reported can be obtained by subtracting the $P_{cpich}$ and MPO from the calculated SNR. The channel gain is in the unit of dB. Then, the obtained channel gain is converted into a linear value $\lambda$.

b) The HS-PDSCH transmit power allocated to the $i^{th}$ user is calculated based on the formula $$P_i = k_i \times \left(u - \frac{1}{\lambda_i}\right),$$

where $\lambda_i$ indicates the linear value of the $i^{th}$ user's channel gain.

c) The CQI values available can be calculated based on the HS-PDSCH transmit power allocated to the user. To be specific, $CQI_{i,Select}=CQI_{i,report}+P_{i,dB}-P_{cpich}-MPO$, where $P_{i,dB}$ indicates the dB value of the HS-PDSCH transmit power $P_i$ allocated to the $i^{th}$ user, and $CQI_{i,report}$ indicates the CQI value reported by the $i^{th}$ user.

Step S203: The TBS corresponding to the CQI value is obtained for each user and thus the total TBS of all users in each code allocation manners is obtained.

The CQI-TBS extended table may be looked-up to obtain the TBS corresponding to the selected CQI value based on the selected CQI value and code. The CQI-TBS extended table may be as shown in Table 2. For example, TBSi,Select=CQI-TBS extended table (CQIi,Select, ki).

After the TBS of each user is obtained, the TBS of multiple users involved in resource allocation is summed up to obtain the total TBS of the cell in the current code allocation manner, that is, $$\sum_{i=1}^{N} TBS_{i,Select}.$$

Step S204: The code allocation manner in which $$\sum_{i=1}^{N} TBS_{i,Select}$$

of the cell is maximum is adopted.

In addition, based on this code allocation manner, the power allocation manner and TBS for multiple users may be selected to serve as the manner for resource allocation among multiple users.

According to the above-mentioned user resource allocation method, the transmission resources may be allocated among users according to the channel conditions of these users. This implements a better configuration of the cell resources and increases the total data transmission amount of a cell. The method for allocating resources among multiple users according to the embodiments may be applicable, but not limited, to the single stream scenario of HSDPA Release 5, Release 7 64QAM, and Release 7 multiple input multiple output (MIMO).

Figure 3:
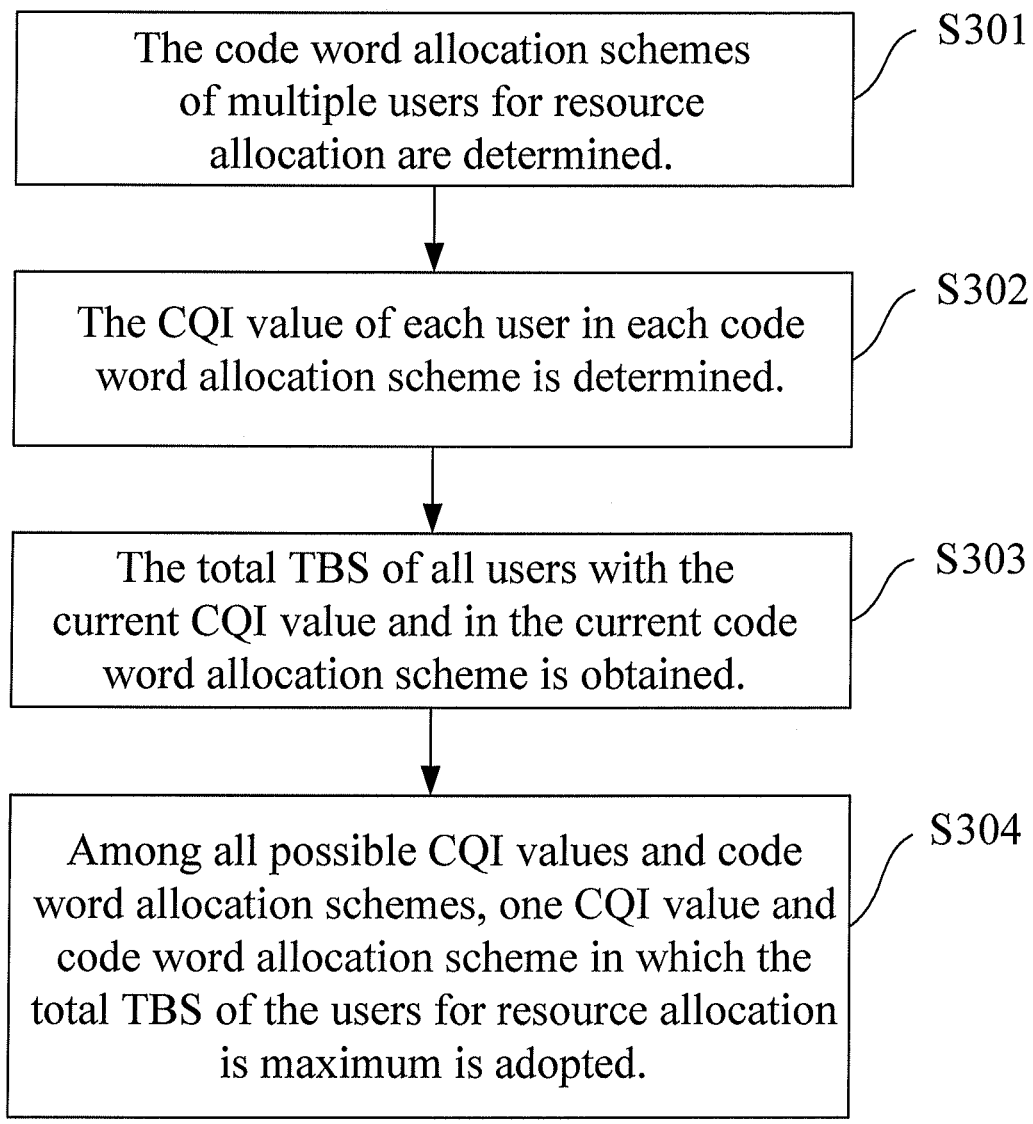
FIG. 3 is a flowchart of a method for allocating resources among multiple users according to yet another embodiment.

As shown in FIG. 3, a flowchart of a method for allocating resources among multiple users according to yet another embodiment is illustrated. This embodiment uses the case of allocating HSDPA air interface resources to two users as an example to describe the method and assumes that the traversal range of the CQI value is 5 and the traversal range of the code is 7. The embodiments are, however, not limited to this. In practice, the HSDPA air interface resources are not limited to be allocated to two users. To be specific, the method includes as follows.

Step S301: The code allocation manners of multiple users involved in resource allocation are determined. To be specific:

a) The CQI values reported by the multiple users involved in resource allocation are sequenced in descending order. For example, the CQI values reported by the multiple users involved in resource allocation are sequenced in descending order. The number of users involved in resource allocation is N. Assume that user m among the N users has the maximum reported CQI value.

b) When other users except user m are allocated the minimum code. For example, when other users except user m are allocated one code, the maximum number of codes available to user m $K_{m,max-Select}$=total number of codes−(N−1).

The traversal range of the code, code combination available to other users except user m may be obtained when the number of codes selected by user m is $K_{m,max-Select}$, $K_{m,max-Select}-1$, . . . , or $K_{m,max-Select}-7$. For example, when the total number of codes is 10 and resources are allocated to user m and user i, possible code allocation manners may be as shown in Table 3.

TABLE 3

| Manner Number | mUser m | iUser i |
|---|---|---|
| 1 | 9 | 1 |
| 2 | 8 | 2 |
| 3 | 7 | 3 |
| 4 | 6 | 4 |
| 5 | 5 | 5 |
| 6 | 4 | 6 |
| 7 | 3 | 7 |
| 8 | 2 | 8 |

Step S302: The CQI value of each user in each code allocation manner is determined.

To be specific, the CQI value of each user in each code allocation may be determined as follows.

a) The maximum value CQI available to the user with a maximum reported CQI value is determined. Based on the determined maximum CQI value and the traversal range of this CQI value, the CQI value of this user is determined.

Assume that resources are allocated to two users and user m has the maximum reported CQI value, if the CQI value of another user except user m, such as user i, is known, the CQI value available to user m may be obtained based on the following formula:

$$CQI_{m,Select} = CQI_{m,report} - (P_{cpich} + MPO) + \\ lin2db\left(P_{total} - \sum_{i=1,i\neq m}^{N} db2lin(P_{cpich} + MPO + CQI_{i,Select} - CQI_{i,report})\right)$$

Where lin2db indicates that the linear value is converted into dB value, db2lin indicates that the dB value is converted into the linear value, $CQI_{i,Select}$ indicates the CQI value selected by user i, and $CQI_{i,report}$ indicates the reported CQI value of user i. When $CQI_{i,Select}$ selected by all users except user m is minimum and the calculated is the maximum CQI value $CQI_{m,max-Select}$ that is available to user m, the determined CQI value of the user whose CQI value is maximum may be $CQI_{m,max-Select}$, $CQI_{m,max-Select}-1$, . . . , or $CQI_{m,max-Select}-5$. The degrade degree of the CQI value selected by user m based on the maximum CQI value is limited by the traversal range of the CQI value.

b) Based on the CQI value of the user whose reported CQI value is maximum, the CQI values of other users among all users involved in the resource allocation are determined. For example, resources are allocated to two users and the traversal range of the CQI value is 5, six CQI values may be available to another user except user m, that is, $\{CQI_{i,Select}, CQI'_{i,Select}, CQI''_{i,Select}, \ldots, CQI'''''_{i,Select}\}$.

When resources are allocated among N users, if the CQI value selected by user m is $CQI_{m,max-Select}$, $CQI_{m,max-Select}-1$, . . . , or $CQI_{m,max-Select}-5$, the number of available CQI values for other users expect user m is $C_{N-1+5}^{N-1}$.

Step S303: The total TBS of all users with the current CQI value and in the current code allocation manner is obtained.

When resources are allocated to two users, if the number of available codes is 10, the traversal range of the CQI value is 5, and the traversal range of the code is 7, the corresponding CQI-TBS extended table may be a part of Table 2, without the last column in Table 2. Based on the selected CQI value and code, the TBS corresponding to the selected CQI value may be obtained by searching a CQI-TBS extended table. To be specific, $TBS_{i,Select}$=CQI-TBS extended table $(CQI_{i,Select}, K_{i,Select})$, where $CQI_{i,Select}$ indicates the CQI value selected for user i, and $K_{i,Select}$ indicates the number of codes selected for user i.

The data transmission amount of the two users are summed up to obtain the total TBS of these two users. Therefore, the total TBS of all users with the current CQI value and in the current code allocation manner is $$\sum_{i=1}^{N} TBS_{i,Select}.$$

Based on the CQI value of each user in each code allocation manner described in Step S302, step S303 may be repeatedly performed to obtain the total TBS of the two users involved in resource allocation with all possible CQI values in all possible code allocation manners.

Step S304: Among all possible CQI values and code allocation manners, one CQI value and code allocation manner in which the total TBS of the users involved in resource allocation is maximum is adopted.

Accordingly, the code allocation manner corresponding to the maximum TBS is used to allocate code resources among users, and the HS-PDSCH transmit power is allocated to the user based on the CQI value corresponding to the maximum TBS.

Embodiments enumerate possible resource allocation combinations in a specified range, and select a manner in which the total TBS is maximum from these resource allocation combinations to serve as the manner for allocation resources among multiple users. Because the TBS indicates the data amount sent by the user, when the total TBS is maximum, the data amount sent by the multiple users is maximum. Therefore, according to the embodiments, during the resource allocation among multiple users, the channel conditions of other users are considered while allocating resources to each user. Thus the total sent data amount of the multiple users is maximized.

Figure 4:
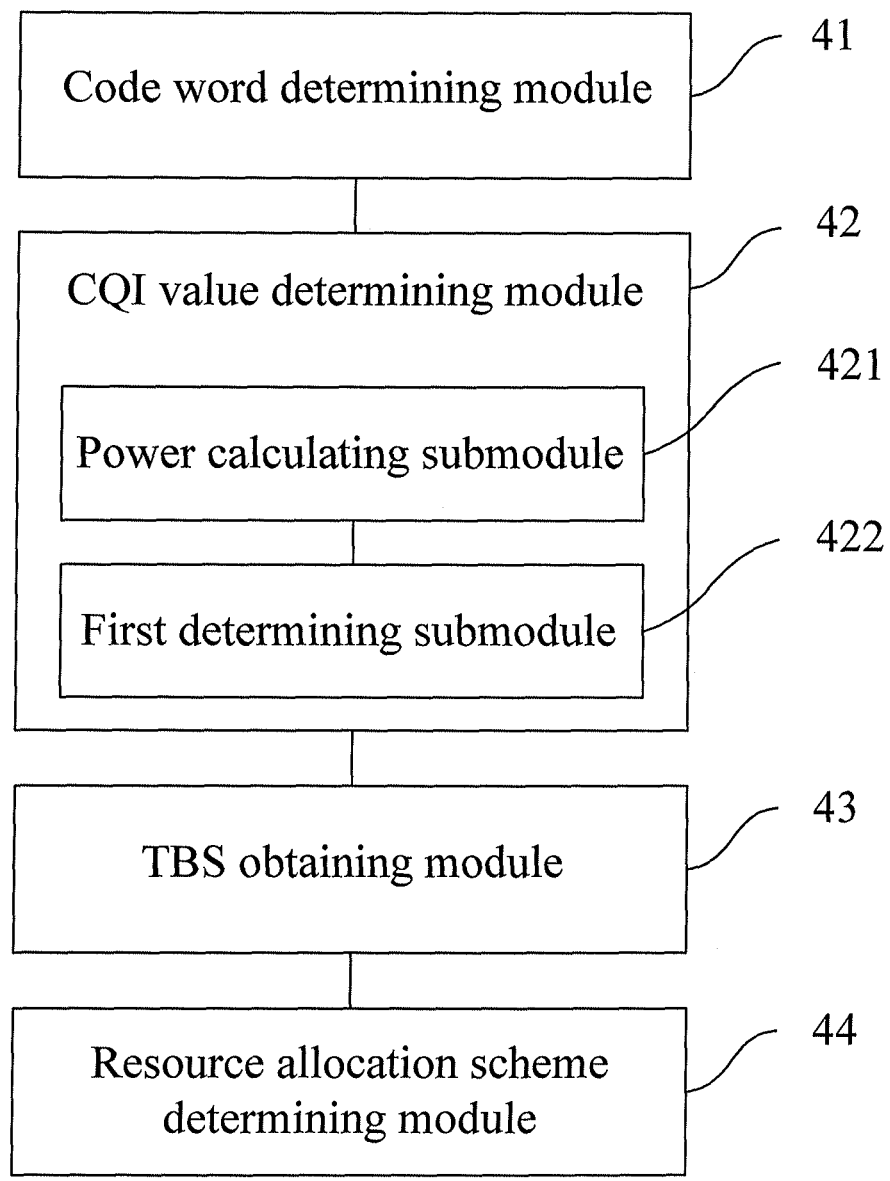
FIG. 4 is a structure view of an apparatus for allocating resources among multiple users according to one embodiment.

FIG. 4 is a structure view of an apparatus for allocating resources among multiple users according to another embodiment. The apparatus may include a code determining module 41, a CQI value determining module 42, a TBS obtaining module 43, and a resource allocating and determining module 44. The code determining module 41 is configured to determine code allocation manners of multiple users involved in resource allocation and determine the number of codes allocated to each user involved in the resource allocation. The CQI value determining module 42 is configured to determine a CQI value for each user in each code allocation manner determined by the code determining module 41. The TBS obtaining module 43 is configured to obtain a TBS of each user corresponding to the CQI value determined by the CQI determining module 42 for each user. The resource allocation determining module 44 is configured to sum up the TBS of all users obtained by the TBS obtaining module 43 to obtain a total TBS of the all users of each code allocation manner, and select the combination of the CQI value and code allocation manner corresponding to the maximum TBS from the total TBS to serve as the manner for resource allocation. Accordingly, the code allocation manner corresponding to the maximum TBS is used to allocate code resources among users, and the HS-PDSCH transmit power is allocated to the user based on the CQI value corresponding to the maximum TBS.

The CQI value determining module 42 may include:

a power calculating sub-module 421, configured to calculate the HS-PDSCH transmit power allocated to each user according to a total HS-PDSCH air interface transmit power of a cell, channel gain of each of the users, and the number of codes allocated to each user by the code determining module 41; and a first determining sub-module 422, configured to determine the CQI value of each user corresponding to the allocated HS-PDSCH transmit power according to the HS-PDSCH transmit power allocated to each user calculated by the power calculating sub-module 421.

Figure 5:
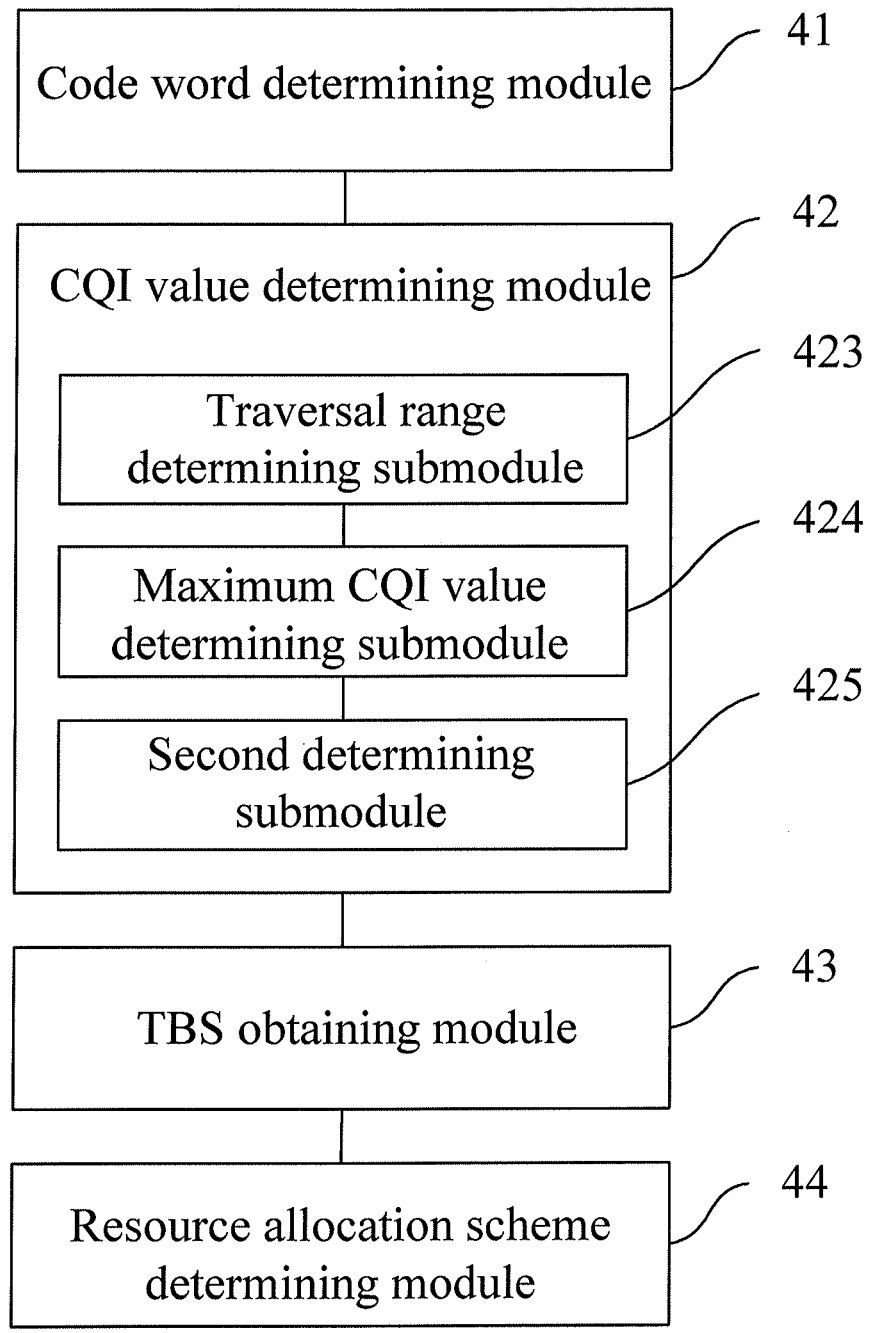
FIG. 5 is a structure view of an apparatus for allocating resources among multiple users according to another embodiment.

According to another embodiment providing the apparatus for allocating resources among multiple users, as shown in FIG. 5, the CQI value determining module 42 may include:

a traverse range determining sub-module 423, configured to determine the traversal range of a CQI value for each user in the code allocation manner determined by the code determining module 41;

a maximum CQI value calculating sub-module 424, configured to calculate the maximum CQI value available to a user whose reported CQI value is maximum; and a second determining sub-module 425, configured to, determine the CQI value for a user whose reported CQI value is maximum based on the maximum CQI value available to the user whose reported CQI value is maximum and the traversal range of the CQI value determined by the traversal range determining sub-module 423, and determine the CQI values for remaining users involved in the resource allocation whose reported CQI values are not maximum based on the CQI value of the user whose reported CQI value is maximum.

In the apparatus for allocation resources among multiple users provided in the embodiments, the code determining module 41 determines the code allocation manners of multiple users involved in resource allocation; the CQI value determining module 42 determines the CQI value of each user in each code allocation manner; the TBS obtaining module 43 obtains each user's TBS corresponding to the CQI value by looking-up the CQI-TBS extended table; the resource allocation manner determining module 44 sums up the TBS of each user to obtain the total TBS of all users in each code allocation manners, and select a manner in which the total TBS is maximum from these resource allocation combinations to serve as the manner for allocation resources among multiple users. According to embodiments, during the resource allocation among multiple users, the channel conditions of other users are considered while allocating resources to each user. This maximizes the sent data amount.

According to the embodiments, those skilled in the art should understand that the embodiments may be implemented by using hardware, and may also be implemented by using software together with necessary universal hardware platform. Based on this understanding, the described technical solution may also be embodied in software products. The software products may be stored in a nonvolatile storage medium (for example CD-ROM, U disk, or movable hard disk), including instructions for enabling a computer (for example, PC, server, or network device) to execute the operations described above.

Those skilled in the art should understand that the accompanying drawings are only exemplary ones for illustrating the embodiments. In the drawings, the modules or flowcharts are not necessarily needed for the implementation of the embodiments.

Those skilled in the art should also understand that the modules included in the apparatus provided in the embodiments may be configured as what is described in the embodiments, and modifications and variables may also be made to the modules so that they may be configured in one or multiple apparatus according to the embodiments. The modules described in the preceding embodiments may be combined into one, and may also be divided into multiple sub-modules.

The preceding embodiments are merely exemplary. Modifications and various substitutions may be made these embodiments and are understood to fall with the scope of the claims.

What is claimed is:

1. A method for allocating resources among multiple users, comprising:

determining code allocation manners of a plurality of users involved in a resource allocation;

determining a respective channel quality indicator (CQI) value for each of the plurality of users in each code allocation manner;

obtaining a respective transmission block size (TBS) for each of the plurality of users corresponding to the respective determined CQI value and a code for each of the plurality of users; and obtaining a plurality of total TBS, wherein obtaining each of the plurality of total TBS comprises combining the respective TBS for each of the plurality of users in each code allocation manner; and selecting a combination of a CQI value and a code allocation manner corresponding to the largest TBS from the plurality of total TBS to serve as a code allocation manner for the resource allocation.

2. The method according to claim 1, wherein determining the code allocation manners of a plurality of users involved in the resource allocation comprises:

determining a number of codes allocated to each user involved in the resource allocation.

3. The method according to claim 1, wherein obtaining the TBS of each user corresponding to the determined CQI value and the code for each user comprises:

searching a CQI-TBS extended table according to the determined CQI value; and obtaining the TBS of each user corresponding to the determined CQI value of the each user.

4. The method according to claim 2, wherein determining the CQI value for each user in each code allocation manner comprises:

obtaining a high-speed physical downlink shared channel (HS-PDSCH) transmit power allocated to each user according to a total HS-PDSCH air interface transmit power of a cell, channel gain of each user, and the number of codes allocated to each user; and determining the CQI value of each user according to the HS-PDSCH transmit power allocated to each user.

5. The method according to claim 4, wherein obtaining the HS-PDSCH transmit power allocated to each user according to a total HS-PDSCH air interface transmit power of a cell, channel gain of each user, and the number of codes allocated to each user comprises calculating a HS-PDSCH transmit power allocated to the $i^{th}$ user $P_i$ as:

$$P_i = k_i \times \left[ \frac{\left(P_{total} - \sum_{i=1}^{N}\left(k_i * \frac{1}{\lambda_i}\right)\right)}{\sum_{i=1}^{N} k_i} - \frac{1}{\lambda_i} \right]$$

where $P_{total}$ is the total HS-PDSCH air interface transmit power, $\mu_i$ is the channel gain of the $i^{th}$ user, and $k_i$ is the number of codes allocated to the $i^{th}$ user.

6. The method according to claim 5, wherein determining the CQI value of each user according to the HS-PDSCH transmit power allocated to each user comprises:

when a decibel value of the HS-PDSCH transmit power $P_i$ allocated to the $i^{th}$ user is $P_{i,dB}$ and a reported CQI value of the $i^{th}$ user is $CQI_{i,report}$, calculating the CQI value $CQI_i$ of the $i^{th}$ user corresponding to the HS-PDSCH transmit power allocated to the $i^{th}$ user as:

$CQI_i = CQI_{i,report} + P_{i,dB} - P_{cpich} - \text{MPO}$ where $P_{cpich}$ is a common pilot channel (CPICH) power and MPO is a measured power offset.

7. The method according to claim 2, wherein determining the CQI value for each user in each code allocation manner comprises:

obtaining a maximum CQI value available to a user whose reported CQI value is maximum; and determining a selected CQI value for a user whose reported CQI value is maximum based on the maximum CQI value available to the user whose reported CQI value is maximum and a preset traversal range of the CQI value in each code allocation manner; and determining the CQI values for all remaining users involved in the resource allocation except the user whose reported CQI values is maximum based on the selected CQI value of the user whose reported CQI value is maximum.

8. The method according to claim 7, wherein obtaining the maximum CQI value available to the user whose reported CQI value is maximum comprises:

calculating the CQI value available to the user whose reported CQI value is maximum based on the CQI values selected by the remaining users involved in the resource allocation whose reported CQI values are not maximum, reported CQI values of the remaining users, the user whose reported CQI value is maximum, a total HS-PDSCH air interface transmit power of a cell, and a common pilot channel (CPICH) transmit power of the cell; and wherein, when the CQI values selected by the remaining users are minimum, the available CQI value of the user whose reported CQI value is maximum is maximum.

9. The method according to claim 1, wherein selecting the combination of the CQI value and code allocation manner corresponding to the maximum TBS from all the total TBSs to serve as the manner for resource allocation comprises:

allocating code resources among users based on the code allocation manner corresponding to the maximum TBS, and allocating a HS-PDSCH transmit power to the users based on the CQI value corresponding to the maximum TBS.

10. An apparatus for allocating resources among multiple users, comprising:

a network device including:

a code determining module configured to determine code allocation manners of a plurality of users involved in resource allocation;

a channel quality indicator (CQI) value determining module configured to determine a respective CQI value for each of the plurality of users in each code allocation manner;

a transmission block size (TBS) obtaining module configured to obtain a respective TBS DM for each of the plurality of users corresponding to the respective determined CQI value and code for each of the plurality, of users; and a resource allocating and determining module configured to obtain a plurality of total TBS, wherein obtaining each of the plurality of total TBS comprises combining the respective TBS for each of the plurality of users in each code allocation manner, and select a combination of the CQI value and code allocation manner corresponding to the largest TBS from the plurality of total TBSs to serve as the manner for the resource allocation.

11. The apparatus according to claim 10, wherein the CQI value determining module comprises:

a power calculating sub-module configured to calculate a high-speed physical downlink shared channel (HS-PDSCH) transmit power allocated to each user according to a total HS-PDSCH air interface transmit power of a cell, channel gain of each user, and a number of codes allocated to each user, which is determined by the code determining module; and a first determining sub-module configured to calculate the CQI value of each user according to the HS-PDSCH transmit power allocated to each user.

12. The apparatus according to claim 10, wherein the CQI value determining module comprises:

a traversal range determining module configured to determine a traversal range of the CQI value for each user in each code allocation manner;

a maximum CQI value calculating sub-module configured to calculate a maximum CQI value available to a user whose reported CQI value is maximum; and a second determining sub-module configured to determine the CQI value for the user whose reported CQI value is maximum based on the maximum CQI value available to the user whose reported CQI value is maximum and the traversal range of the CQI value determined by the traversal range determining sub-module, and determine the CQI values for all remaining users for resource allocation except the user whose reported CQI values is maximum based on the CQI value of the user whose reported CQI value is maximum.

13. A network side system, comprising an apparatus which is configured to allocate resources among multiple users, the apparatus comprising:
   a network device comprising:
   a code determining module configured to determine code allocation manners of a plurality of users involved in resource allocation;
   a channel quality indicator (CQI) value determining module configured to determine a respective CQI value for each of the plurality of users in each code allocation manner;
   a transmission block size (TBS) obtaining module, configured to obtain the a respective TBS for each of the plurality of users corresponding to the respective determined CQI value and code for each of the plurality of users; and
   a resource allocating and determining module configured to obtain a plurality of total TBS, wherein obtaining each of the plurality of total TBS comprises combining the respective TBS for each of the plurality of users in each code allocation manner and select a combination of the CQI value and code allocation manner corresponding to a largest TBS from the plurality of total TBSs to serve as a code allocation manner for the resource allocation.

* * * * *